United States Patent
Boon et al.

(10) Patent No.: US 10,185,142 B1
(45) Date of Patent: Jan. 22, 2019

(54) SYSTEMS AND METHODS FOR IMPROVING A FLUID CONTACT LAYER IN AN ELECTROWETTING ELEMENT

(71) Applicant: Amazon Technologies, Inc., Seattle, WA (US)

(72) Inventors: Gerben Boon, Roermond (NL); Chiara Cometti, Eindhoven (NL); Pavel Novoselov, Eindhoven (NL); Lara Tauk, Eindhoven (NL)

(73) Assignee: Amazon Technologies, Inc., Seattle, WA (US)

(*) Notice: Subject to any disclaimer, the term of this patent is extended or adjusted under 35 U.S.C. 154(b) by 304 days.

(21) Appl. No.: 14/976,797

(22) Filed: Dec. 21, 2015

(51) Int. Cl.
  *G02B 26/00* (2006.01)
  *B05D 1/18* (2006.01)
  *G09G 3/34* (2006.01)
  *B05D 1/26* (2006.01)
  *B05D 1/00* (2006.01)
  *B05D 1/28* (2006.01)

(52) U.S. Cl.
  CPC .......... *G02B 26/005* (2013.01); *B05D 1/005* (2013.01); *B05D 1/18* (2013.01); *B05D 1/265* (2013.01); *B05D 1/286* (2013.01); *G09G 3/348* (2013.01)

(58) Field of Classification Search
  CPC ........ G02B 26/005; B05D 1/005; B05D 1/18; B05D 1/1265; B05D 1/286; G09G 3/348
  See application file for complete search history.

(56) References Cited

U.S. PATENT DOCUMENTS

| | | | |
|---|---|---|---|
| 2010/0296149 A1* | 11/2010 | Feenstra | G02B 26/004 359/290 |
| 2011/0157678 A1* | 6/2011 | Chen | G02B 26/004 359/290 |
| 2012/0275009 A1* | 11/2012 | Vermeulen | G02B 26/005 359/290 |
| 2013/0171546 A1* | 7/2013 | White | B05D 1/60 429/508 |
| 2013/0342889 A1* | 12/2013 | Kim | G02B 26/005 359/290 |
| 2014/0266992 A1* | 9/2014 | Schram | G02B 26/005 345/60 |
| 2016/0259160 A1* | 9/2016 | Hsiao | G02B 26/02 |

* cited by examiner

*Primary Examiner* — Ariel Balaoing
(74) *Attorney, Agent, or Firm* — EIP US LLP

(57) ABSTRACT

An electrowetting element comprising a first fluid and a second fluid immiscible with the first fluid. A support plate comprises a first layer comprising a migration pathway, the first layer comprising a first surface in contact with at least one of the first fluid or the second fluid. A substance is disposed within at least a portion of the migration pathway in the first layer. The substance is distinct from both the first fluid and the second fluid and is configured to reduce migration of at least a component of the first fluid or a component of the second fluid into the migration pathway in the first layer.

12 Claims, 5 Drawing Sheets

SYSTEMS AND METHODS FOR IMPROVING A FLUID CONTACT LAYER IN AN ELECTROWETTING ELEMENT

BACKGROUND

Electrowetting display devices may comprise picture elements, wherein an oil layer covers a display area of a particular picture element when that picture element is in an off state, and wherein the oil layer is retracted so as to cover less of the display area when the picture element is in an on state. In particular, to switch the picture element to the on state, a voltage is applied to an electrically conductive fluid via an electrode, the electrically conductive fluid being in contact with, but immiscible with, the oil. To switch the picture element to the off state, the voltage is switched off.

Over time, the switching performance of the electrowetting display device may deteriorate. It is desirable to improve the lifetime of an electrowetting display device.

DETAILED DESCRIPTION

Figure 1:
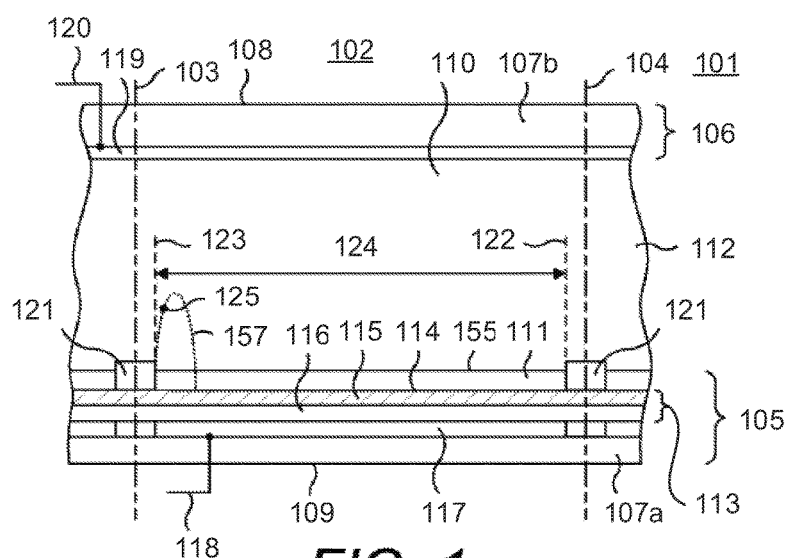
FIG. 1 shows schematically an example electrowetting element.

Electrowetting display elements may include several aspects, such as a wettable layer. In examples, the wettable layer is a fluid contact layer that may be in contact with one or more fluids in the electrowetting display element. The wettability of the wettable layer may relate to the relative affinity of the layer with respect to the one or more fluids.

Electrowetting display elements may have states, such as on and off, which correspond with the relative arrangement of the one or more fluids. For example, in an off state, a first fluid may substantially cover the wettable layer, while in an on state, the first fluid may only cover a portion of the wettable layer. In examples, the state of the display element may be affected, for example switched between off and on or vice versa, by applying a voltage to the wettable layer in order to change its wettability with respect to the one or more fluids.

The wettability of the wettable layer may be affected over time by physical changes in the layer. For example, if one or more of the fluids migrates into the wettable layer over time, it may affect the wettability of the layer with respect to the one or more fluids, which, in-turn, may affect the ability to switch the state of the display element reliably, or to hold a state once switched.

The one or more fluids in a display element may migrate into and in some cases through the wettable layer via migration pathways, which may include things such as pinholes, pores, spaces, interstitial spaces, recesses, apertures, voids, channels, conduits, and others as are known by those of skill in the art. These migration pathways may allow transmission of a fluid through the wettable layer into an adjacent layer or structure of the display element, which may in-turn negatively affect the performance or longevity of the display element.

While it is possible to make a layer, such as the wettable layer, thicker in order to increase the time it takes for a fluid to migrate through the layers, making layers thicker may require the use of additional materials in manufacturing and may increase the overall thickness of the display element—both of which may be undesirable. Further, increasing the layer thickness may affect the dielectric properties of the display element and require a higher driving voltage, which may be similarly undesirable. It may also be possible to select a material (or materials) with which to form the wettable layer that inherently has fewer migration pathways. However, the materials available for selection may be limited by, for example, cost, compatibility, and production considerations. Thus, it is desirable to reduce the migration of fluids in the electrowetting element through migration pathways in wettable layer by other means.

One such method to reduce the migration of fluids through migration pathways in a wettable layer is to modify the composition of the material used to form the wettable layer before manufacturing the display element. Modifying the composition of the material forming the wettable layer may mitigate the presence of migration pathways that are otherwise inherent in the material.

Another method to reduce migration of fluids through migration pathways in a wettable layer is to treat the wettable layer during manufacturing of the display element. In such a method, the wettable layer may first be formed, and then the wettable layer may be treated in order to, for example, fill or otherwise block the migration pathway, which may beneficially reduce the migration of fluids through migration pathways.

FIG. 1 shows a diagrammatic cross-section of part of an example of an electrowetting display device 101. Electrowetting display device 101, includes a plurality of picture elements or display elements, such as display element 102, which may also be referred to as electrowetting pixels. Display element 102 is an example of an electrowetting cell or an electrowetting element that may produce a display effect. In the example display element 102 depicted in FIG. 1, the lateral extent of display element 102 is indicated by dashed lines 103 and 104. Display element 102 comprises a first support plate 105 and a second support plate 106. Support plates 105 and 106 may be separate parts of each display element, or the support plates may be shared in common by a plurality of display elements. Support plates 105 and 106 include for example a glass or polymer substrate 107a and 107b, respectively, and may be rigid or flexible. In these and other examples, the support plates of a display element, such as display element 102, may include further layers and/or structures, such as walls 121, circuitry for controlling the display elements (e.g., electrode 117 and signal line 118), and others that are not depicted in FIG. 1 for clarity.

In the example display element 102 depicted in FIG. 1, the extent of display element 102 is indicated by the dashed lines 103 and 104, emanating from the center of walls 121. Further, in this example, the area of the surface between walls 121 of display element 102, indicated by the dashed lines 122 and 123, may be referred to as the display area 124, over which a display effect occurs.

The display effect depends on both the extent that first fluid 111 and second fluid 112 adjoin the surface defined by the display area 124, and the magnitude of the voltage V applied to display element 102. In particular, in some examples, the first fluid 111 may cover all or the majority of the display area 124 when no voltage is applied to the display element 102. In other examples, the first fluid may cover less than all or the majority of the display area when no voltage is applied to the display area 102. Further, the magnitude of the applied voltage V may alter the configuration of first fluid 111 and second fluid 112 within display element 102. The alteration of the configuration of first fluid 111 and second fluid 112 may give rise to the display effect and alter a display state of display element 102 for an observer looking at display device 101. When switching the display element 102 from one fluid configuration to a different fluid configuration, the extent of second fluid 112 adjoining the surface of display area 124 may increase or decrease, with the extent of first fluid 111 adjoining the surface of display area 124 decreasing or increasing, respectively.

Display device 101 includes a viewing side 108 upon which an image or display effect formed by the display device can be viewed. Viewing side 108 of display device 101 includes second support plate 106, which includes substrate 107*b*. Display device 1 also includes rear side 109 including first support plate 105, which includes substrate 107*a*. In other examples, a surface of first support plate 105 may instead be the viewing side.

Display device 101 may be of several types, including: reflective, transmissive or transflective type. Display device 101 may be an active matrix driven or a direct drive display device. Display element 102 may be monochrome or color. In some examples of a color display device, the display elements may be divided into groups, each group having a different color, while in other examples, an individual display element may be able to produce different colors.

Display element 102 includes space 110, which may otherwise be considered to be a chamber, between the support plates, which may be filled with a plurality of fluids. In the example of FIG. 1, space 110 is filled with first fluid 111 and second fluid 112. In this and other examples, second fluid 112 is substantially immiscible with first fluid 111, which is to say that first fluid 111 and second fluid 112 do not substantially mix with each other. In some examples, first fluid 111 and second fluid 112 do not mix with each other to any degree, while in other examples there may be some degree of mixing of first fluid 111 and second fluid 112. Even in such cases, the degree of mixing may be considered negligible in that the majority of the volume of first fluid 111 is not mixed with the majority of the volume of second fluid 112. The substantial immiscibility of first fluid 111 and second fluid 112 may be due to the properties of each fluids, such as, for example, their chemical compositions.

Due to this immiscibility, first fluid 111 and second fluid 112 tend to remain separated from each other, therefore tending not to mix together to form a homogeneous mixture, and instead meet each other at an interface, which may alternatively be referred to as a boundary or a meniscus. FIG. 1 depicts an example of an interface 155 that may exist when no voltage is applied to display element 102, and another example of an interface 157 that may exist when a voltage is applied to display element 102. Interfaces 155 and 157 each indicate a boundary or interface between the volume of first fluid 111 and the volume of second fluid 112. The location and shape of the interface between first fluid 111 and second fluid 112 may be determined by the voltage applied to display element 102.

Notably, the relative thickness of the first fluid 111 layer and the second fluid 112 layer depicted in FIG. 1 are examples; in other examples, the first fluid 111 layer and the second fluid 112 layer (and potentially other fluid layers) may have different thicknesses.

In this example, first fluid 111 is electrically non-conductive. For example, first fluid 111 may include: an alkane, like decane, dodecane, or hexadecane; a silicone oil; a decalin (otherwise known as bicyclo-4,4,0-decane); and others. First fluid 111 may also absorb at least a part of the visible light spectrum. For example, first fluid 111 may be transmissive for a part of the visible light spectrum, thereby forming a color filter. First fluid 111 may also be colored by addition of pigment particles or a dye. In some examples, first fluid 111 may be black and may absorb substantially all parts of the visible light spectrum. In some example, first fluid 111 may be reflective. For example, first fluid 111 may reflect the entire visible spectrum, making the fluid layer appear white, or may reflect only part of the visible light spectrum, making the fluid layer have a color. In some example, first fluid 111 may not absorb all wavelengths within a given spectrum, but may absorb the majority of wavelengths within the given spectrum. Thus, first fluid 111 may be configured to absorb substantially all light incident thereupon. In some example, first fluid 111 may absorb 90% or more of light in the visible spectrum and incident thereupon.

First fluid 111 is confined to display element 102 by walls 121, which follow the cross-section of display element 102. The cross-section of a display element may have any shape. When the display elements are arranged in a matrix form, the cross-section is usually square or rectangular. In FIG. 1, walls 121 are shown as structures formed on a surface of and protruding from insulating layer 113. In other examples, walls 121 may instead be part of a surface layer of the support plate that repels the first fluid, such as a hydrophilic or less hydrophobic layer. In the example shown in FIG. 1, walls 121 extend only partly from first support plate 105 to second support plate 106. However, in other examples, walls may extend fully from first support plate 105 to second support plate 106.

In this example, second fluid 112 is at least one of electrically conductive or polar. That is, in this and other examples, the second fluid is electrically conductive, polar, or both. Electrically conductive may mean that second fluid 112 is capable of conducting electricity; that is, an electrical current may flow through second fluid 112 due to the flow of ions through second fluid 112. Polar may mean that second fluid 112 comprises at least one compound or component having a molecule with a net dipole; that is, the molecule has an overall dipole moment across the molecular structure due to an electron distribution, with at least one part of the molecule having a negative electrical charge and at least one different part of the molecule having a positive electrical charge. Such dipole moments include permanent dipoles. Polarity may be caused, for example, by the presence of one or more atom-to-atom bond in the molecule, with, for example, one of the atoms being a heteroatom, such as oxygen or nitrogen. Such a polar atom-to-atom bond may be a bond between an oxygen (O) atom and a hydrogen (H) atom, such as an —O—H bond, which may be in some examples due to the presence of at least one hydroxyl (—OH) group. The presence of such bonds may cause hydrogen bonding between different molecules within the second fluid.

In some examples, second fluid 112 may be water, or a salt solution, such as a solution of potassium chloride in water. In some example, second fluid 112 may be transparent or colored. Examples of colored fluids may also be referred to as selective color absorbing fluids.

First support plate 105 of display element 102 includes insulating layer 113. Insulating layer 113 may be transparent, for example fully transparent or transmissive to visible light. Insulating layer 113 may extend between walls 121 of display element 102. To avoid short circuits between second fluid 112 and electrode 117 under insulating layer 113, insulating layer 113 may extend uninterrupted over a plurality of display elements. Insulating layer 113 includes surface 114 closest to space 110 of display element 102. In some examples, the thickness of insulating layer 113 may be less than 10 micrometers, or less than 1 micrometer, or less than 400 nanometers.

Insulating layer 113 may include a wettable layer 115. In examples, the wettable layer is the layer in contact with one or more fluids, such as first fluid 111 and second fluid 112, described above. In some examples the wettable layer may alternatively be referred to as the fluid contact layer. Wettability relates to the relative affinity of a fluid for the surface of a solid. Wettability may be measured by the contact angle between a boundary of the fluid and the surface of the solid. The contact angle is determined by the difference in surface tension between the fluid and the solid at the fluid-solid boundary. For example, a high difference in surface tension can indicate hydrophobic properties. As the skilled person will appreciate, a material may be considered to be hydrophobic if the contact angle with water is greater than 90 degrees; a material may therefore be considered to be hydrophilic if the contact angle with water is less than 90 degrees.

In some examples, a wettable layer may be a hydrophobic layer, formed of a hydrophobic material, such as Teflon® AF1600, Teflon® AF2400, Hyflon® AD40, Hyflon® AD60, or Cytop® (available appropriately from DuPoint, Solvay and Asahi Glass). In some examples, a hydrophobic layer comprises more than 80%, more than 90%, more than 95%, approximately 100% or 100% of a hydrophobic material by weight or by volume. The remainder of the hydrophobic layer may, for example, be formed of a different material than a hydrophobic material.

When there is no voltage being applied to display element 102, first fluid 111 adheres preferentially to the surface of wettable layer 115 because the surface of wettable layer 115 has a greater wettability for first fluid 111 than for second fluid 112. When, instead, the applied voltage is a sufficient, non-zero driving voltage, the surface of wettable layer 115 has a higher wettability for second fluid 112 than for the first fluid 111. In examples where wettable layer 115 is hydrophobic, the surface of the wettable layer may be more hydrophobic when no voltage is applied to the display element 102. Similarly, in examples where wettable layer 115 is hydrophobic, the surface of the wettable layer may be more hydrophilic when a driving voltage is applied to the display element 102.

Display element 102 includes a first electrode 117 as part of the support plate 105. In the example shown in FIG. 1, there is one first electrode 117 per display element. In other examples, there may be more than one electrode per display element. First electrode 117 may be of any desired shape or form. First electrode 117 of display element 102 is supplied with voltage signals by signal line 118. Electrode 117 is electrically insulated from first fluid 111 and second fluid 112 by insulating layer 113. In some examples, electrodes of neighboring display elements may be separated by a non-conducting layer, while in other examples, electrodes of neighboring display elements may be electrically connected. In some examples, further layers may be arranged between insulating layer 113 and first electrode 117.

Second support plate 106 includes second electrode 119, which is connected to second signal line 120, and which extends between walls of display element 102. In some examples, second electrode 119 may be disposed, for example located, above and/or covering or overlapping the walls of the display element and/or extend uninterruptedly over a plurality of display elements. Alternatively, the electrode may be arranged at a border of the support plates, where it is in electrical contact with second fluid 112. In FIG. 1, second electrode 119 is uninterrupted by walls and fluidly interconnected to all display elements by shared second fluid 112. Thus, second electrode 119 is common to all display elements in the example shown in FIG. 1.

First electrode 117 and second electrode 119 may be made of, for example, a transparent conductive material, such as indium tin oxide (ITO).

Display element 102, includes a capacitor. In FIG. 1, a first plate of the capacitor is first electrode 117 and a second plate of the capacitor is second electrode 119 on second support plate 106.

Display element 102 can be controlled by a voltage V applied between signal lines 118 and 120, which may be coupled to a display driving system. For example, signal line 118 can be coupled to a matrix of control lines on substrate 107a.

Figure 2:
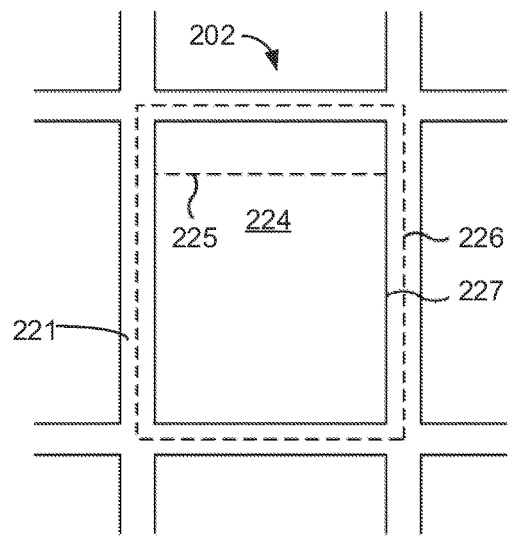
FIG. 2 shows schematically a plan view of the example electrowetting element of FIG. 1.

FIG. 2 shows a matrix of rectangular display elements in a plan view. For example, display element 202 may be the display element 102 of FIG. 1 depicted in a plan view. In the example display element 202 depicted in FIG. 2, the outer boundary of display element 202 is indicated by dashed line 226, which corresponds to dashed lines 103 and 104 in FIG. 1. Solid line 227 indicates the inner border of a wall 221 and is also the edge of display area 224 of display element 202. In this example, display area 224 is a hydrophobic surface of first support plate 105 of FIG. 1. Note that in other examples, the walls 221 of display element 202 may be formed into different shapes, for example, not square or rectangular. Further, in other examples, the display area 224 may similarly be formed into different shapes, for example, not square or rectangular.

As described above, when a zero or substantially zero voltage is applied between first electrode 117 and second electrode 119 (shown in FIG. 1), for example when the electrowetting element is in an off state, first fluid 111 forms a layer extending between the walls 121, as shown in FIG. 1. When a non-zero voltage is applied between first electrode 117 and second electrode 119 (shown in FIG. 1), for example when the electrowetting element is in an on state, second fluid 112 will displace first fluid 111 such that first fluid 111 will retract (or contract) against a wall, as shown by the dashed shape 225 in FIG. 2 (and 125 in FIG. 1). Accordingly, the controllable displacement of first fluid 111 in dependence on the magnitude of the applied voltage is used to operate the display element as a light valve and to provide a display effect over display area 224. For example, displacing first fluid 111 to increase adjoinment of second fluid 112 with display area 224 may increase the brightness of the display effect provided by display element 102. The display state of display element 102 may therefore go from black to white, or to any intermediate grey state in a black and white display device; or from black to a color of varying brightness in a color display device.

Figure 3:
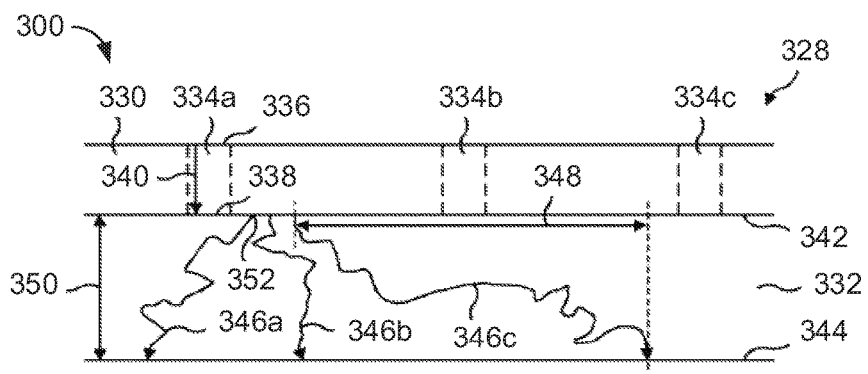
FIG. 3 shows schematically an example of layers of a support plate of an example electrowetting element.

FIG. 3 shows an example of a plurality of layers 328 of a support plate of a display element 300, such as layers of insulating layer 113 of display element 102 of FIG. 1. In some examples, first layer 330 may be a wettable layer, such as hydrophobic layer 115 of FIG. 1. The plurality of layers 328 include first layer 330 disposed, for example located, on second layer 332. The plurality of layers 328 includes a plurality of migration pathways. For example, the first layer includes a plurality of migration pathways. A migration pathway is, for example, any empty space or void within a layer, such as first layer 330 or second layer 332, which is large enough for at least one component of at least one of the first fluid or the second fluid to pass through. Migration pathways may include things such as pinholes, pores, spaces, interstitial spaces, recesses, apertures, voids, channels, conduits, and others as are known by those of skill in the art. For example, voids between polymer molecules, for example polymer chains, interstitial spaces between molecules, or pores in a material at least partly forming a layer may be considered to form at least part of a migration pathway where such voids or spaces allow the at least one component of at least one of the first fluid or the second fluid to migrate, for example by diffusion, capillary action, or other transmissive processes, through the layer.

Migration pathways may allow transmission of a fluid, such as the first and second fluids described herein, through a layer into an adjacent layer or structure of the display element. Transmission involves at least one component of at least one of the first fluid or the second fluid being incident on a side of the first layer, travelling through the first layer and then exiting the first layer on an opposite side. For example, transmission may refer to passage, migration, diffusion or other movement of the at least one component of at least one of the first fluid or the second fluid through a layer. Passage of the at least one component of at least one of the first fluid or the second fluid only partly through a layer, for example such that the at least one component of at least one of the first fluid or the second fluid enters but does not exit the layer, is not considered transmission of the at least one component of at least one of the first fluid or the second fluid through the first layer.

In FIG. 3, first layer 330 comprises a first plurality of pinholes 334a, 334b, 334c, collectively referred to with the reference numeral 334. Pinholes 334 may be through-holes that pass substantially directly from one side of layer 330 to the other side. In the example shown in FIG. 3, pinholes 334 each have a pinhole pathway (although only pinhole pathway 340 is labelled for clarity). In further examples, a pinhole of the first plurality of pinholes may have one or more pathways between first and second ends which is not suitable for at least one component of at least one of the first or second fluids to pass through. For example, the one or more pathways may be narrower than a molecule size of at least one component of the second fluid, for example of water molecules. Such pathways are not considered to be a pinhole pathway. In examples, where a fluid is formed of more than one component, for example different molecular components such as water and a polyol, some of the components of the fluid may be able to pass through a pinhole pathway and some may not. This may be the case where some of the components of the fluid, for example one component, are small enough to fit through the pinhole and follow the pinhole pathway while other components of the fluid are too large. Alternatively, for example where the pinhole is relatively large compared to molecules of the fluid, all components of the second fluid may pass through the pinhole pathway.

As the skilled person will appreciate, a pinhole is a term of art; a pinhole's dimensions do not necessarily correspond with those of a pin. Rather, a pinhole may have a width of the order of nanometers, which may be comparable to or larger than the size of a molecule transmissible through the pinhole (which molecule may otherwise be referred to as a permeant molecule). For example, a pinhole may have a width greater than or equal to 0.3 nanometers with water and/or oxygen as a permeant molecule. Pinholes may have a variety of shapes; for example, a pinhole may be cylindrical, cuboid or tapering towards one end.

Pinholes can be detected using a variety of methods, as the skilled person will appreciate. For example, pinholes in an inorganic layer may be detected by electroplating the layer and then imaging the layer using scanning electron microscopy (SEM) to obtain an image of the layer in which the pinholes are visible. For example, copper can be electroplated on the layer and then inspected using optical or electron microscopy, as is known in the art. Alternatively, light may be scattered from gas bubbles which form at pinholes in some cases. The scattered light in such cases can be imaged directly, for example, using optical microscopy. Further techniques to visualize pinholes in, for example, an inorganic layer include confocal microscopy and transmission electron microscopy, as are known in the art. These techniques may include exposing inorganic layers to an oxygen ($O_2$) reactive ion etching (RIE) plasma. Exposure to atomic oxygen, the main reactive species in $O_2$ plasma, causes etching of the polymeric material through the pinholes present in the inorganic layer, which can be visualized using the optical techniques discussed above.

The plurality of layers 328 may beneficially reduce transmission of fluids through various layers of the display element. Transmission of at least one component of the any fluid from the chamber of an electrowetting display element, for example, towards an electrode, may adversely affect the performance of the display element. For example, a display state normally obtainable by a display element at a given applied voltage may be altered by such transmission such that the same display state may no longer be achievable at the given voltage, thus deteriorating the display quality. Additionally, transmission of at least one component of the any fluid from the chamber of a display element may reduce a lifetime of an electrowetting display device. Therefore, the plurality of layers 328 may help maintain the mechanical and electrical integrity of an electrowetting display element and increase the lifetime of an electrowetting display device.

FIG. 3 also depicts second layer 332, which has first surface 342 contacting first layer 330 and second surface 344 closest to, and in some examples contacting, an electrode (not shown). Second layer 332, in this example, has a plurality of migration pathways 346a, 346b, 346c, collectively referred to with the reference numeral 346, some of which are shown schematically in FIG. 3. The migration pathways may allow for transmission of at least one component of at least one of the first fluid or the second fluid, for example of the second fluid, through second layer 332.

In some examples, a migration pathway may extend into an adjacent electrowetting element. In further examples, at least one of the migration pathways may extend laterally through the second layer by a distance which is at least twice the thickness of the second layer, or at least one of the migration pathways may extend laterally into a second layer of an adjacent electrowetting element, for example by extending in a sideways direction such as in a direction parallel or substantially parallel, for example within plus or minus 1%, 2%, 5% or 10% of parallel, to a plane of the display area described above with reference to FIG. 1. In the example of FIG. 3, one of the migration pathways 346c extends laterally with a distance 348 which is at least twice as large as a thickness 350 of the second layer 332.

Migration pathways that are significantly longer than, or have a lateral length that is greater than, a thickness of the second layer and may therefore provide a route through the second layer for the at least one component of the at least one of the first fluid or the second fluid which is, for example, tortuous, meandering or circuitous. Such tortuous migration pathways may reduce the rate of transmission of at least one component of at least one of the first fluid or the second fluid through the second layer and therefore reduce the rate of leakage of at least one component of at least one of the first fluid or the second fluid.

Migration pathways running at shallow angles compared to the surface of a layer may thus not be aligned or coincident (e.g., is at least partly orthogonal) to an electric field line when the display element has a driving voltage applied to it. Consequently, in these parts of the migration pathway, there is no electric field gradient in the lateral direction and therefore no driving force for moving at least one component of at least one of the first fluid or the second fluid, for example water and/or ions, through the plurality of layers in a lateral direction along the migration pathway. This effect assists to reduce transmission of at least one component of at least one of the first fluid or the second fluid through the second layer, for example, by increasing the time taken for the at least one component of the at least one of the first fluid or the second fluid to pass from one side of the second layer to an opposite side of the second layer.

In FIG. 3, first layer 330 comprises a material with a first transmission rate for transmission of at least one component of at least one of the first fluid or the second fluid through first layer 330 and second layer 332 comprises a material with a second transmission rate for transmission of the at least one component of the at least one of the first fluid or the second fluid through the second layer 332. The transmission rate in examples is the rate of transmission, in other words passage, of a fluid or at least one component of a fluid through a layer or material. The first transmission rate includes transmission through the plurality of migration pathways.

Various techniques may be used to measure the transmission rate as the skilled person will appreciate, including gravimetric techniques which measure the gain or loss of a fluid by mass, a calcium (Ca) test which can be used to measure the water permeability of a layer deposited on a thin film of calcium or barium by measuring the change in transmissivity or reflectivity over time, and a Mocon test, which utilizes a coulometric detector to measure the permeation of water vapor (available from Mocon Inc., 7500 Mendelssohn Ave N, Minneapolis, Minn. 55428, USA). It is to be noted that to be compared against each other two transmission rates are to be measured under the same conditions, for example temperature and humidity, to ensure an accurate comparison between the two measurements.

In FIG. 3, first layer 330 has a first layer volume, for example 1 micrometer cubed ($\mu m^3$) or 1 millimeter cubed ($mm^3$), and a first plurality of voids that collectively occupy a first total void volume. A void is typically any space in a material. Thus, for example, pinholes, interstitial spaces and pores are all types of voids. Second layer 332 has a second layer volume and a plurality of voids that collectively occupy a second total void volume. The first and second void volumes may be referred to as first and second void fractions for a unit volume, respectively. In some examples, the first layer volume is the same as the second layer volume. In some examples, the first total void volume is lower than the second total void volume. When the second void fraction is higher than the first void fraction, second layer 332 may act like a sponge and trap at least one component of at least one of the first fluid or the second fluid in its voids, which reduces the rate at which the at least one component of at least one of the first fluid or the second fluid is transmitted through second layer 332.

The void fraction of a material may be measured using a variety of methods as will be appreciated by the person skilled in the art, including: transmission electron microscopy (TEM); industrial computerized tomography (CT) scanning of a sample to create a 3D rendering of external and internal geometry of that sample and then analyzing the rendering to determine the void fraction; gravimetric methods which involve saturating voids with a liquid and then performing a desorption technique, for example by heating the sample in an oven, while performing a gravimetric or calorimetric analysis (known as thermal gravimetric analysis (TGA) and differential scanning calorimetry (DSC) respectively); optical methods which involve determining the area of the material compared with the area of voids visible under a microscope; methods involving determining the volume of the solid part of a sample, determining the total volume of a sample including voids and then calculating the void fraction from this; and in situ ellipsometry methods that involve monitoring the change in refractive index of an analyzed layer during adsorption and desorption of an organic solvent (also referred to as ellipsometric porosimetry).

The void fractions of various fluoropolymers, such as may be used in layers of a display element, for example, first layer 330 in FIG. 1, may be determined through the aforementioned methods. For example, Hyflon® AD60 may have a void fraction of approximately 9.4%; Teflon® AF1600 may have a void fraction of approximately 32.0%; and Teflon® AF2400 may have a void fraction of approximately 37.4%. In general, examples of layers in display elements, such as first layer 330 in FIG. 1 may have void fractions in the range of 3-35% or 3-10%. Further, the dimensions of the voids may also be determined. For example, the average radii of spherical microcavities in Hyflon® AD60 is 3.8-4.1 Å (where Å is Angstroms); the average radii of spherical microcavities in Teflon® AF2400 is 5.8-8.0 Å; and the average radii of spherical microcavities in Teflon® AF1600 is 4.4-5.4 Å.

In FIG. 3, second layer 332 comprises at least one inorganic material and/or at least one organic material. For example, second layer 332 may comprise more than 80%, more than 90%, more than 95%, approximately 100% or 100% of at least one inorganic material by weight or by volume, or may comprise more than 80%, more than 90%, more than 95%, approximately 100% or 100% of at least one organic material by weight or by volume. An organic material is typically any material or compound that comprises a carbon atom bonded to a hydrogen atom, i.e. a C—H bond. An organic compound may, for example, be a polymer. A polymer is a molecule formed of a plurality of repeating monomer molecules as the skilled person will understand. In some examples, the monomer molecules link together to form a backbone of the polymer molecule. As will be appreciated by the skilled person, the repeating monomer molecules may not all be the same. For example, the organic compound may be a co-polymer comprising a repetition of two or more different monomer molecules in an arbitrary ratio.

The organic material of a layer may comprise a plurality of polymer molecules that together form an amorphous solid material, where amorphous may mean that a material is substantially, predominantly, or entirely, non-crystalline. A non-crystalline material has no crystalline structures, for example no ordered arrangement of atoms arranged as a two dimensional or three dimensional lattice. In other examples, the organic material may comprise a polymer with a substantially (for example predominantly, or entirely) crystalline structure, which for example has an ordered arrangement of molecule chains, such as folded chains.

The inorganic material of a layer may comprise any material or compound that is not organic. Therefore, an inorganic material or compound may not include carbon or may not include a carbon atom bonded to a hydrogen atom (i.e. a C—H bond). An inorganic material may be a crystalline material that comprises atoms which form one or more lattices. An inorganic material may also be amorphous.

Figure 4:
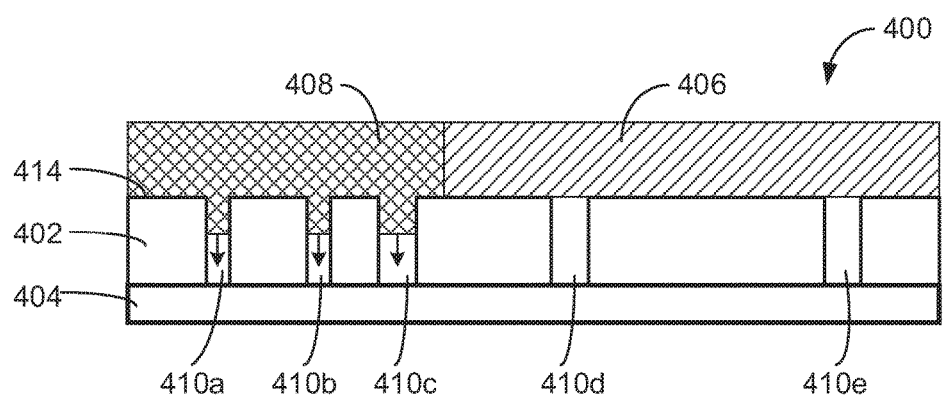
FIG. 4 shows schematically an example of a wettable layer of an example electrowetting element.

FIG. 4 depicts an example of a wettable layer 402, such as hydrophobic layer 115 of FIG. 1. Wettable layer 402 is part of an electrowetting display element 400 as described herein. Wettable layer 402 is disposed upon underlying layer 404. Underlying layer 404 may be, for example, any of the layers described with reference to FIG. 1, such as a layer of an insulating layer, a barrier layer, an electrode, or others as are described herein.

FIG. 4 also depicts first fluid 406 and second fluid 408 similar for example to those described in other examples described herein. In the example of FIG. 4, first fluid 406 is a non-conductive and/or non-polar fluid immiscible with second fluid 408, and second fluid 408 is conductive and/or polar fluid immiscible with first fluid 406. In the example depicted in FIG. 4, first fluid 406 covers a portion of wettable layer 402, while second fluid 408 covers the remaining portion. Thus, FIG. 4 depicts an example of a display element in an on state as viewed from the side of the display area.

As is shown in FIG. 4, wettable layer 402 includes a plurality of pinholes 410a, 410b, 410c, 410d, and 410e, collectively referred to by reference numeral 410. In other examples, pinholes 410a, 410b, 410c, 410d, and 410e may comprise other types of migration pathways as described herein. Based on the presence of pinholes 410a, 410b, 410c, 410d, and 410e, wettable layer 402 may be described as porous or having a porosity. Porosity may alternatively be referred to as void fraction, as described above.

As shown in FIG. 4, second fluid 408 has begun to migrate into pinholes 410a, 410b, and 410c and below the surface 414 of wettable layer 402. The migration of second fluid 408 into pinholes 410a, 410b, and 410c in this example is because the size of molecules in second fluid 408 is smaller than the openings of each of pinholes 410a, 410b, and 410c. Notably, in some examples, it may only be a component of second fluid 408 that migrates into pinholes 410a, 410b, and 410c.

First fluid 406, on the other hand, has not migrated into pinholes 410d and 410e because, in this example, the size of the molecules in first fluid 406 is larger than the openings of each of pinholes 410d and 410e. In particular, even if first fluid 406 is comprised of different component parts, in this example, none of those individual parts is smaller than the openings of each of pinholes 410d and 410e.

As described above, fluid migration through any layer of a display element, including the wettable layer, is undesirable because such migration can adversely affect the performance and longevity of the display element. While, as described above, it is possible to make layers thicker or to stack layers, or both, in order to increase the time it takes for fluid (or components thereof) to migrate through the layer(s) (e.g. to decrease the transmission rate of fluids through the layers), such approaches are not without consequence. For example, making layers thicker and/or stacking layers may require the use of additional and/or more viscous material(s) in manufacturing and may increase the overall thickness of the display element—both of which may be undesirable. Further, increasing the layer thickness and/or number of layers may affect the dielectric properties of the display element and require a higher driving voltage, which may be similarly undesirable. It may also be possible to select a material (or materials) to comprise a layer, such as wettable layer 402, which inherently has fewer migration pathways per unit volume. However, the materials available for selection may be limited by, for example, cost, compatibility, and production considerations. Thus, it is desirable to reduce or prevent entirely the migration of fluids, such as first fluid 406 and second fluid 408 through the migration pathways in wettable layer 402 by other means.

One such method to reduce migration of fluids through the migration pathways in wettable layer 402 is to modify the composition of the material used to form the wettable layer before manufacturing the display element. Modifying the composition of the material forming the wettable layer may mitigate the presence of migration pathways that are inherent in the material.

Modifying the material composition prior to manufacturing the display element may comprise adding one or more substances to the material during formulation so that the resulting material has a modified material composition with relatively fewer migration pathways per unit volume. In other words, the substance may reduce the void space in the resulting modified material. By modifying the material composition to have relatively fewer migration pathways, the overall rate of migration of fluids, such as first fluid 406 and second fluid 408, or components thereof, may be beneficially reduced. In other words, because there are fewer migration pathways in the modified material, there will be fewer opportunities for the fluids to migrate through the wettable layer.

Adding the substance to the material during formulation may also be referred to as impregnating the material with the substance or densification of the material with the substance. The substance may be in some examples a liquid. In some examples, the substance added to the material composition may reduce the void space by 10%, 20%, 30%, 40%, or greater than 50% in the modified material composition. However, it is important that any substance added to the material composition prior to manufacturing the display element is stable during the manufacturing process. For example, it is important that the substance does not overly evaporate during any process step, e.g. a heating step, and that the substance is not replaced by any solvent used during the manufacturing of the display element.

It is also important in examples to avoid over-saturating the material composition with the substance because the modified material composition may negatively affect performance of the display element. For example, adding too much of the substance to the material composition may negatively affect wettability of the resulting layer, e.g., wettable layer 402.

Examples of such substances that may be used to modify the material composition of the wettable layer before manufacturing the display element, include: fluorinated materials that are compatible with the material composition and remain in the material upon further processing (e.g. during heating or annealing), for example due to a sufficiently similar wettability to the material composition. Depending on the type of material used for the hydrophobic layer, suitable substances may include: a straight chain perfluorinated alkane having the general formula F—(CF$_2$)—F, for example perfluorononane (C$_9$F$_{20}$), perfluoropentadecane (C$_{15}$F$_{32}$); a cyclic perfluorinated alkane like perfluorodecalin (C$_{10}$F$_{18}$); a branched perfluorinated alkane; a partly fluorinated alkane (such as a hydrofluorocarbon compound) which is an alkane with at least one but not all hydrogen atoms each substituted with a fluorine atom; a fluorinated compound like a perfluoroether, a perfluoropolyether, a perfluorinated amine (which for example has a primary, secondary or a tertiary amine with for example respectively one two or three perfluoro alkyl group bonded to the nitrogen of the amine group); or a fully or partly fluorinated nonionic surfactant (e.g. a fluoroaliphatic polyoxyethylene). In some examples, the substance added to the composition may be effective in low concentrations. For example, the substance may effectively reduce the void space in the modified material composition at concentrations as low as 1000 parts per million (PPM), 500 PPM, 250 PPM, or less than 100 PPM. In some examples, the concentration of the substance (e.g. a fluorinated solvent) in the modified material after manufacturing is, for example, less than 2%.

Further examples of such substances may include: straight chain alkanes (e.g., hexadecane, dodecane, octane, and hexane) and branched alkanes that are compatible with the hydrophobic material. In some examples, the substance may be an oil, such as a silicone oil.

Another method to reduce migration of fluids through the migration pathways in wettable layer 402 is to treat the wettable layer after it has been formed during manufacturing of the display element. In such a method, the wettable layer 402 may first be formed, for example, on an underlying layer of a support plate, such as first support plate 5 of FIG. 1, by methods known to those of skill in the art, for example using a spin coating technique. Once formed, the wettable layer 402 may have an initial porosity or void space based on, for example, its material composition and its method of manufacture. The wettable layer may then be treated in order to mitigate the initial porosity or void space.

One such treatment is to expose the wettable layer 402 to a substance that prevents fluids, or components thereof, from entering the migration pathways (e.g., pores or void spaces) in the wettable layer 402. The substance may prevent fluids, or components thereof, from entering the migration pathways in many ways. For example, the substance may fill the migration pathways and prevent fluids from entering them or occupying any space within them. Or the substance may instead block, plug, clog, or otherwise close off the migration pathway such that fluids are not able to enter even though other parts of the migration pathways may remain open. For example, the migration pathway may have an initial opening size that reduces along the length of the migration pathway, and therefore may allow a substance to penetrate the pathway only partially such that the substance is only within a portion of the migration pathway (e.g. until such time as the size of the substance's component parts are larger than the size of the migration pathway). In this way, it may not be necessary to completely fill in the pores or void spaces in order to prevent the migration of fluids, or components thereof, into the migration pathways, but rather to cut off or congest or otherwise hinder the initial entry of fluids into the migration pathways. Examples of substances that may be used to reduce migration of fluids through the migration pathways in wettable layer, such as wettable layer 402, are described below with respect to FIGS. 5A and 5B.

Figure 5A:
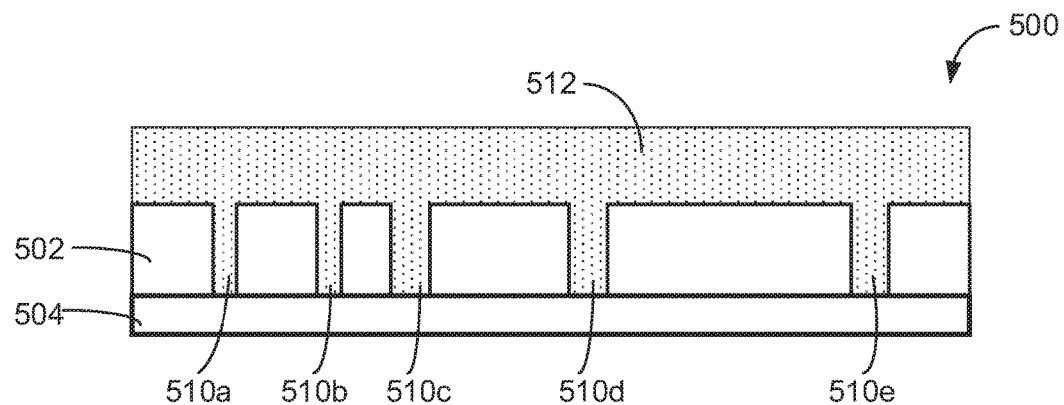
FIG. 5A shows schematically an example of a wettable layer of an example electrowetting element being treated by a substance.

FIG. 5A depicts an example of wettable layer 502 of display element 500 submerged in a liquid substance 512 such that liquid substance 512 is able to migrate into migration pathways, such as pinholes 510a, 510b, 510c, 510d, and 510e (collectively referred to by reference numeral 510). In some examples, the migration of liquid substance 512 into pinholes 510 is relatively fast, for example, reaching an effective penetration of wettable layer 502 pinholes 510 within minutes, while in other examples, the migration of liquid substance 512 into pinholes 510 is relatively slow, for example, reaching an effective penetration of wettable layer 502 in hours or even days.

In some examples, the rate of migration of liquid substance 512 into pinholes 510 may be increased by exposing the liquid substance and wettable layer 502 to an increased pressure (e.g. an above ambient pressure). The increased pressure may act on the substance 512 and motivate it to migrate into pinholes 510.

In some examples, the rate of migration of liquid substance 512 into pinholes 510 may be increased by exposing wettable layer 502 to a negative pressure, such as a vacuum, before submerging wettable layer 502 in liquid substance 512. In such examples, the negative pressure may increase the size of the migration pathways, such as pinholes 510, such that substance 512 more readily migrates into pinholes 510.

In some examples, the rate of migration of liquid substance 512 into pinholes 510 may be increased by varying a pressure exposed to wettable layer 502 back and forth between negative pressure and positive pressure (as compared to ambient pressure) during manufacturing of the display element.

In some examples, the rate of the migration of liquid substance 512 into pinholes 510 may be increased by changing the temperature (e.g., raising or lowering the temperature) of liquid substance 512, the wettable layer 502, or both, so as to increase the rate of migration.

In some examples, both pressure and temperature may be used to increase the rate of migration of liquid substance 512 into pinholes 510. For example, liquid substance 512 may be brought to a temperature and pressure above its critical point so that it exists in a supercritical state, i.e., between a gas and liquid state. In a supercritical state, substance 512 may migrate into pinholes 510 as well as diffuse through the solid wettable layer 502, thereby impregnating wettable layer 502 with substance 512. Alternatively, a supercritical fluid may be used to deposit a substance dissolved in the supercritical fluid onto a surface, such as wettable layer 502. The substance deposited by the supercritical fluid may be, for example, a functional nanostructured film or a nanometer-size particle.

An important consideration for methods of treating migration pathways with a substance introduced to wettable layer 502 during manufacturing of the display element is that the substance (for example, liquid substance 512) should not only be able to migrate into the migration pathways (for example, pinholes 510), but it should also be inclined to stay in the migration pathways and effectively block them. For example, if substance 512 migrates through pinholes 510 completely, then pinholes 510 will once again be open to migration by any other fluid, for example, first fluid 406 and second fluid 408 of FIG. 4. In some examples, the substance may stay in the migration pathways by way of, for example, surface tension, adhesion, charge attraction, capillary action, and others as are known by those of skill in the art. In other examples, the substance may be compatible with the material of the layer, such as described above for example with respect to fluorinated solvents. In other examples, the substance may have a molecular structure such that a part of the molecule enters the migration pathway and becomes trapped while another part of the molecule remains outside of the migration pathway. In such examples, the substance effectively blocks the migration pathway without completely filling the migration pathway.

Figure 5B:
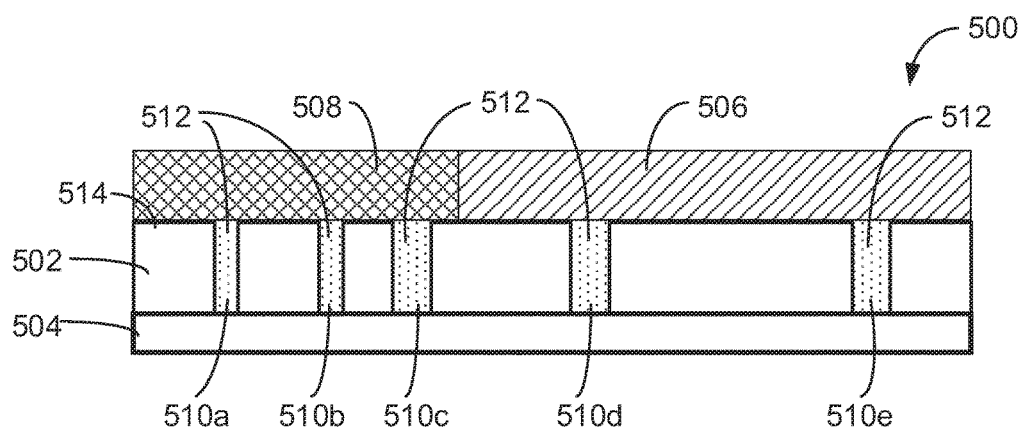
FIG. 5B shows schematically an example of a wettable layer of an example electrowetting element after treatment by a substance.

FIG. 5B shows an on state with a non-zero voltage applied for the electrowetting element and depicts wettable layer 502 after being treated by substance 512 (e.g., after being submerged in substance 512, as described above). Notably, pinholes 510a, 510b, 510c, 510d, and 510e each retain substance 512, while first fluid 506 and second fluid 508 reside on the surface 514 of wettable layer 502. Thus, in this example, substance 512 effectively blocks migration of either the first fluid 506 or the second fluid 508 (and components thereof) into pinholes 510. In this example, substance 512 is a substance distinct from both first fluid 506 and second fluid 508. For example, substance 512 has a different chemical composition than both first fluid 506 and second fluid 508. Given its different composition, substance 512 may be described as comprising a substance which, compared with the wettable layer without the substance, gives the wettable layer a fluid transmission rate through the wettable layer 502 that is lower than one or both of a first fluid 506 transmission rate through the wettable layer 502 and a second fluid 508 transmission rate through the wettable layer 502. Consequently, substance 512 will reduce the rate of transmission of both first fluid 506 and second fluid 508 through the wettable layer. In some examples, the rate of transmission of one or both of first fluid 506 and second fluid 508 is negligible, substantially zero, or zero. In some examples, substance 512 is immiscible with one or both of first fluid 506 and second fluid 508. In some examples, substance 512 is non-conductive and/or non-polar.

As discussed above, it is possible to stack layers having different porosities or void spaces by choosing different materials for those layers. However, certain layers may be limited in their material composition by characteristic, compatibility, cost, and other considerations. For example, wettable layer 502 may be limited to materials that exhibit strong hydrophobic properties. Thus, in some examples, underlying layer 504 may comprise a material that has porosity characteristics such that substance 512 will not migrate through it. Such layering may help to trap or confine substance 512 within pinholes 510 during and after manufacturing of the display element.

Examples of substances, such as substance 512 in FIGS. 5A and 5B, are similar to substances described and include: a compound of a sufficiently small molecule that is compatible with the first fluid 506, such as straight chain alkanes (e.g., dodecane, octane, and hexane) and branched alkanes. In examples, the substance is small enough to fit in one or more migration pathways. For example, substances may have dimensions in the range of 4.2-5.5 Å, such as for example straight chain and monosubstituted alkanes (paraffins) containing 5 to 8 carbon atoms; 5.5-7.1 Å, such as for disubstituted alkanes containing 5 to 8 carbon atoms; 6.1-6.7 Å for ethyl substituted alkanes containing 5 to 8 carbon atoms; or 6.7-6.8 Å for trisubstituted alkanes. In some examples, a longer straight chain alkyl group might be used as the substance where the straight chain alkyl group can enter a migration pathway due to a sufficiently small size. In some examples, substance 512 may be an oil, such as a silicone oil, similar or identical to a carrier liquid of first fluid 506. Such a carrier liquid may be an alkane or silicone oil as described above, in which is dissolved or suspended a pigment or dye of the first fluid. However, substance 512 may still be distinct from, in other words, having a different composition than, first fluid 506 where, for example, substance 512 is a pure oil or alkane without the dissolved dye or suspended pigment (due to the dye or pigment molecules being too large to fit in the migration pathways) and first fluid 506 is a fluid comprising the carrier liquid with the dye dissolved therein and/or the pigment suspended therein, or containing other additives as are known by those of skill in the art. In other examples the substance may be an alkane as described above but different from a carrier liquid compound of the first fluid.

Further examples of substances include: fluorinated materials such as: a straight chain perfluorinated alkane having the general formula F—$(CF_2)$—F, for example perfluorononane ($C_9F_{20}$), perfluoropentadecane ($C_{15}F_{32}$); a cyclic perfluorinated alkane like perfluorodecalin ($C_{10}F_{18}$); a branched perfluorinated alkane; a partly fluorinated alkane (such as a hydrofluorocarbon compound) which is an alkane with at least one but not all hydrogen atoms each substituted with a fluorine atom; a fluorinated compound like a perfluoroether, a perfluoropolyether, a perfluorinated amine (which for example has a primary, secondary or a tertiary amine with for example respectively one two or three perfluoro alkyl group bonded to the nitrogen of the amine group); or a fully or partly fluorinated nonionic surfactant (e.g. a fluoroaliphatic polyoxyethylene).

Methods of reducing migration of fluids, or components thereof, through migration pathways in a wettable layer, such as those described above, may beneficially increase the performance and prolong the lifetime of a display element. In particular, if the migration of fluids through the wettable layer is sufficiently reduced by such methods, other layers of the display element, such as, for example, the barrier layer, may be reduced in size or even eliminated in examples of display elements. Additionally, reducing migration of fluids through migration pathways in the wettable layer by filling or otherwise blocking those migration pathways may improve surface properties of the wettable layer, such as wettability, thereby improving performance of the wettable layer.

Figure 6:
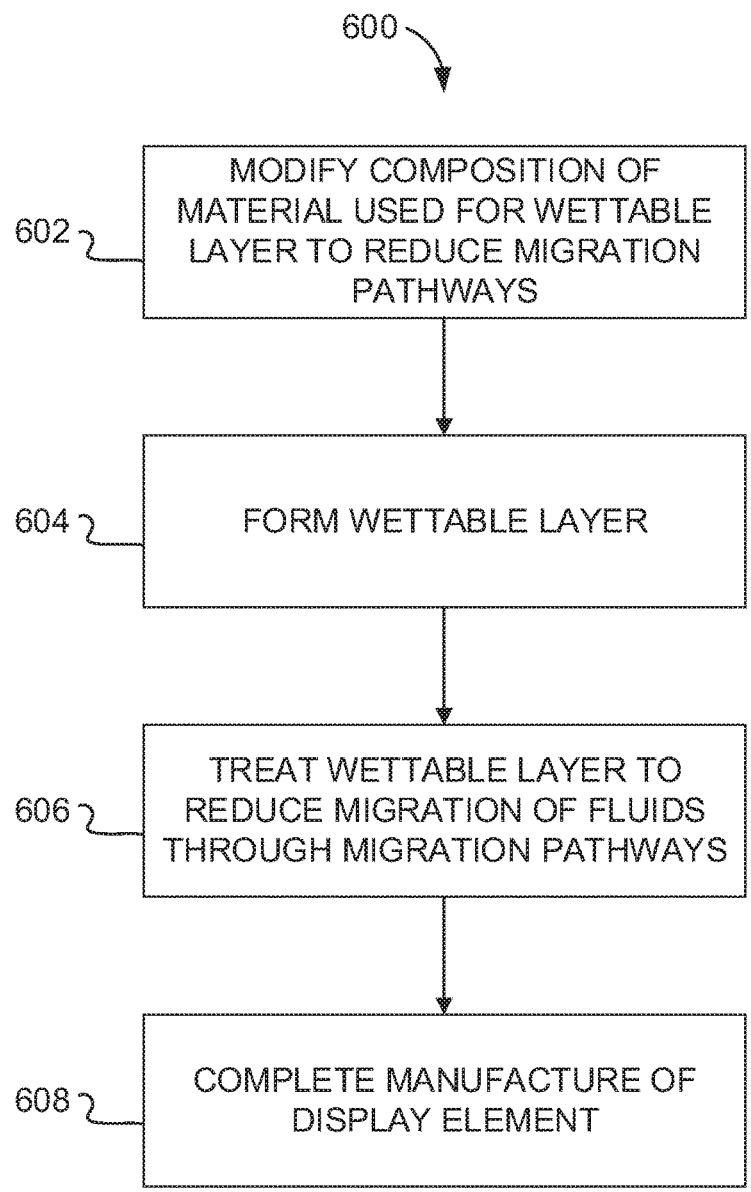
FIG. 6 is a flow diagram relating to examples of a method of manufacturing an electrowetting element.

FIG. 6 depicts a method 600 for reducing the migration of fluids or components thereof through migration pathways in a wettable layer of a display element. For example, method 600 may be applied to hydrophobic layer 115 of FIG. 1, 402 of FIG. 4, 502 of FIG. 5, or first layer 330 of FIG. 3.

In step 602 of method 600, a material from which a wettable layer will be formed is modified. As explained above, modifying the material may comprise adding one or more substances to the material during formulation so that the resulting material has a modified material composition with relatively fewer migration pathways per unit volume e.g. less void space. In this example, formulation of the material occurs before applying the material to form the wettable layer, e.g., by depositing the material onto an underlying layer. In some examples, the substance added to the material composition may reduce the migration pathways by 10%, 20%, 30%, 40%, or greater than 50% in the modified material composition.

In step 604 of method 600, a wettable layer is formed. In some examples, the wettable layer is formed by applying a material (e.g., depositing the material) on an underlying layer. In example methods, a material being applied on an underlying layer may be applied directly on, and therefore in contact with, the underlying layer. In other examples, the material may be applied indirectly on the underlying layer, with a further layer between the material and the underlying layer.

In examples, a wet process may be used to deposit a material on an underlying layer, for example, to form a wettable layer (e.g. layer 502 of FIGS. 5A and 5B), or to deposit a substance onto the wettable layer (e.g. substance 512 of FIGS. 5A and 5B). In a wet process, the material may be applied on the underlying layer as a liquid using, for example, a slot die coating process, a spincoating process or a flexoprinting process. Slot die coating involves applying a liquid through a slot onto an underlying layer, which may be passed underneath the slot by rollers for example. In spincoating, a liquid material is applied, for example deposited, at or close to the center of an underlying layer which is then rotated to spread the liquid material across the underlying layer by centrifugal force. In flexoprinting, a layer of a liquid material is transferred onto a roller or plate with a desired pattern. A scraper, known in the art as a doctor blade, removes an excess of the liquid material from the roller. Then the layer on which the liquid material is to be transferred is sandwiched between the roller or plate and an impression cylinder to transfer the liquid material to an underlying layer. The liquid material may then be dried. In examples described herein where for example a slot die coating process, a spincoating process or a flexoprinting process is used to deposit the substance (elsewhere referred to herein as a first substance) on a first layer (such as the wettable layer), it is to be appreciated that once sufficient of the substance has filled or blocked migration pathways in the first layer, any remaining substance on the surface of the first layer is then removed, without being baked or otherwise hardened.

In step 606 of method 600, the wettable layer may be treated to reduce migration of fluids through the migration pathways in the wettable layer. For example, a substance may be deposited on a wettable layer by a wet process so as to fill or block migration pathways in the wettable layer. In examples, the wettable layer may be soaked for a period of time in order to increase the penetration of the substance into any migration pathways in the wettable layer. The period of soaking the wettable layer in the substance may be determined based on characteristics of both the wettable layer and the substance. In some examples, the wettable layer is soaked for less than a minute. In other examples, the wettable layer is soaked for between one and fifteen minutes. In yet further examples, the wettable layer is soaked for more than fifteen minutes. After the wettable layer is soaked with the substance, the remaining substance, in other words, the substance not deposited within the migration pathways, may be removed before further processing the display element.

In some examples, the wettable layer may further be subjected to changes in conditions of the manufacturing environment in order to increase the increase the efficacy of the treatment. For example, the wettable layer may be subjected to an increased or decreased pressure (as compared to the ambient manufacturing environment); the temperature of the wettable layer may be increased or decreased (as compared to the ambient manufacturing environment); or combinations thereof in order to increase the efficacy of the treatment. For example, particular temperatures and pressures may increase the rate at which the substance fills the migration pathways in the wettable layer during the aforementioned soaking process.

In some examples, the treatment of the wettable layer in step 606 of method 600 is done after the pixel walls are formed (e.g. pixel walls 121 in FIG. 1). In such examples, it may be beneficial to form the pixel walls before treating the wettable layer in order to avoid any substance becoming entrapped between the pixel wall and the wettable layer and thereby reducing the effectiveness of the bond between the pixel wall and the wettable layer.

In other examples, the treatment of the wettable layer in step 606 of method 600 is done before the pixel walls are formed. In such examples, it may be beneficial to form the pixel walls after treating the wettable layer in order to protect the wettable layer against contamination during other manufacturing steps, such as forming the pixel walls.

In step 608 of method 600, the manufacturing of the display element may be completed. For example, wall material may be applied, for example deposited, on the wettable layer either directly or indirectly. The wall material may then be patterned to form at least one wall for confining the first fluid to a display area of the second support plate. The wall material may be SU8 and the patterning may therefore be performed using an appropriate photoresist technique as the skilled person will readily understand. The display elements may then be filled with a plurality of fluids, such as at least the first and second fluids described above. Finally, additional layers, such as a top support plate, may be added and electrical interconnections made by made.

Notably, the method of 600 may include all of the aforementioned steps in some example, and only a subset of the recited steps in another example. For example, it may not be necessary to perform both steps 602 and 606 in order to reduce migration of fluids through migration pathways in a wettable layer. In some examples, method 600 is performed without step 602, while in other examples, method 600 is performed without step 606. In other words, either step 602 or step 606 may be sufficient to reduce migration of fluids through migration pathways in a wettable layer.

Figure 7:
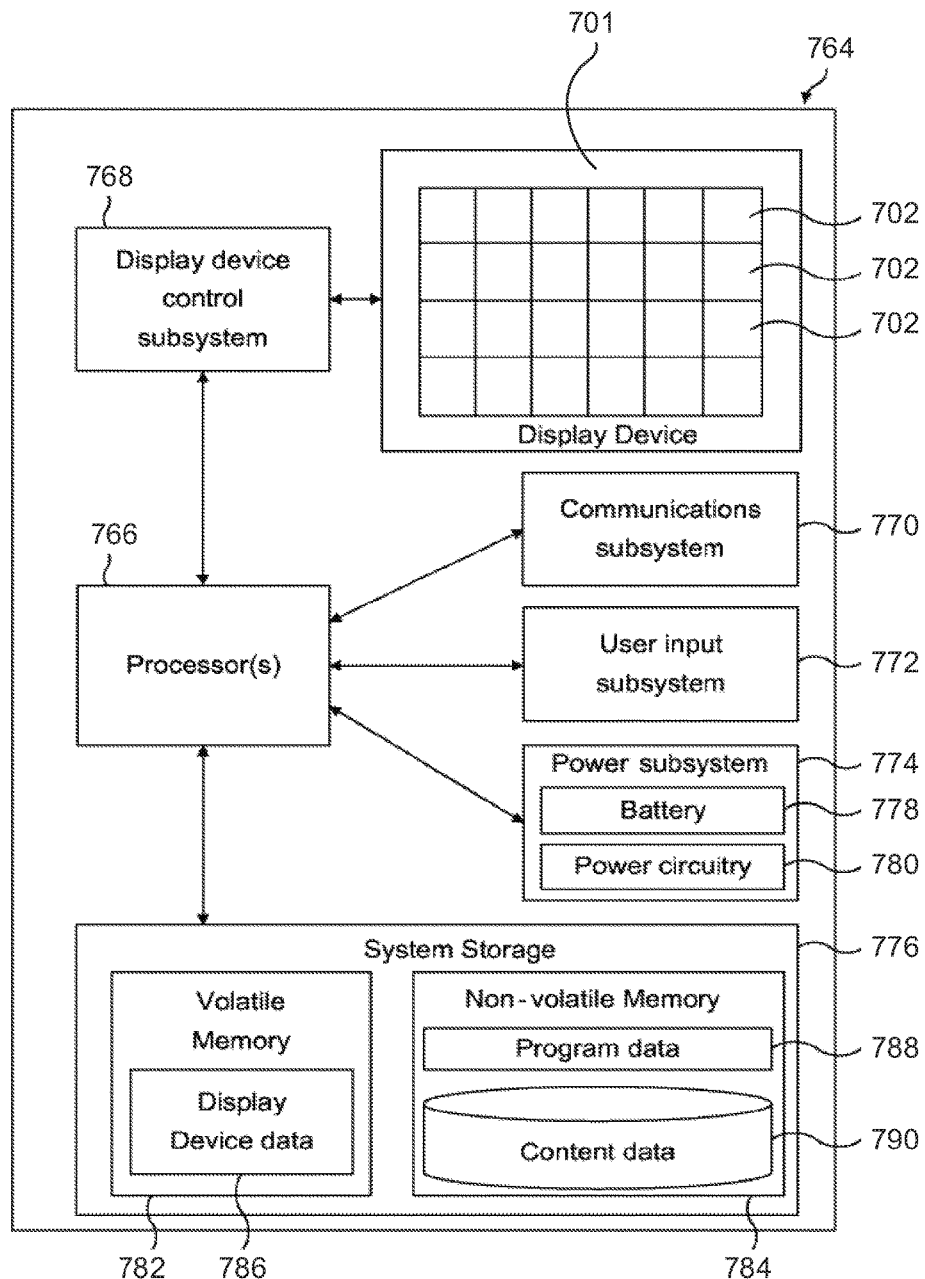
FIG. 7 shows a schematic system diagram of an example apparatus including an electrowetting display device.

FIG. 7 shows schematically a system diagram of an example system, for example apparatus 764, comprising an electrowetting display device such as the electrowetting display device 701 described above comprising electrowetting display elements 702. The apparatus is for example a portable, e.g. mobile, device such as an electronic reader device such as a so-called e-reader, a tablet computing device, a laptop computing device, a mobile telecommunications device, a watch or a satellite navigation device. In other examples, the apparatus may alternatively be a display screen for installation in any machine or device requiring a display screen, for example a consumer appliance.

The system diagram illustrates an example of a basic hardware architecture of the apparatus 764. The apparatus includes at least one processor 766 connected to and therefore in data communication with, for example: a display device control subsystem 768, a communications subsystem 770, a user input subsystem 772, a power subsystem 774, and system storage 776.

The display device control subsystem 768 is connected to and is therefore in data communication with the display device 701. The at least one processor 766 is, for example, a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example, those of the system storage 776. The at least one processor may additionally, or in the alternative, contain memory, such as processor registers, on-board cache, and others as are known by those of skill in the art.

The display device control subsystem 768 includes, for example, electrowetting display element driver components for use in applying a voltage to any of the electrowetting display elements 702. In examples, the electrowetting display elements 702 are configured according to an active matrix configuration and the display device control subsystem 768 is configured to control switching elements, such as thin film transistors (TFTs), of the display device 701 via circuitry to control the electrowetting display elements. The circuitry may include signal and control lines such as those described above.

The communications subsystem 770 is configured for the apparatus to communicate with, for example, a computing device via a data network, for example a computer network, such as: the Internet, a local area network, a wide area network, a telecommunications network, a wired network, a wireless network, or some other type of network. The communications subsystem 770 may further comprise an input/output (I/O) interface, such as: a universal serial bus (USB) connection, a Bluetooth or infrared connection, or a data network interface for connecting the apparatus to a data network such as any of those described above. In some examples, content data may be transferred to the apparatus via the communications subsystem 770.

The user input subsystem 772 may include, for example, an input device for receiving input from a user of the apparatus. Example input devices include, but are not limited to: a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including, for example, an output device for providing output to a user of the apparatus. Examples of such output devices include, but are not limited to: a printing device, an audio output device including for example one or more speakers, headphones, earphones, alarms, or haptic output devices. The output device may be a connector port for connecting to one of the other output devices described, such as earphones.

The power subsystem 774 includes power circuitry 780 for use in transferring and controlling power consumed by the apparatus 764. The power may be provided by a mains electricity supply or from a battery 778, via the power circuitry 780. The power circuitry 780 may further be used for charging the battery from a mains electricity supply.

The system storage 776 includes at least one memory, for example, at least one of volatile memory 782 and non-volatile memory 784, and may comprise a non-transitory computer readable storage medium. The volatile memory may, for example, be a Random Access Memory (RAM). The non-volatile (NV) memory may, for example, be a solid state drive (SSD) such as Flash memory, or Read Only Memory (ROM). Further storage technologies may be used, for example, magnetic, optical or tape media, compact disc (CD), digital versatile disc (DVD), Blu-ray, or other data storage media as are known by those of skill in the art. The volatile memory 782 and/or non-volatile memory 784 may be removable or non-removable.

Any of the memories may store data for controlling apparatus 764, in particular components or subsystems of apparatus 764. Such data may, for example, be in the form of computer-readable and/or executable instructions, e.g., computer program instructions. Thus, at least one memory and the computer program instructions may be configured to, with the at least one processor 766, control a display effect provided by the electrowetting display device 701.

In the example of FIG. 7, volatile memory 782 stores, for example, display device data 786, which is indicative of display effects to be provided by the display device 701. The processor 766 may transmit data, based on the display device data, to the display device control subsystem 768, which thereafter outputs signals to the display device 701 for applying voltages to the display elements 702, which causes display effects from the display device 701. Non-volatile memory 784 stores, for example, program data 788 and/or content data 790.

Program data 788 is, for example, data representing computer executable instructions (e.g., in the form of computer software) used by apparatus 764 in order to run applications or program modules on apparatus 764. For example, program data 788 may cause components or subsystems of apparatus 764 to perform certain functions or tasks. An application or program module data includes any of routines, programs, objects, components, data structures or similar.

Content data 790 is, for example, data representing content representative of any form of media, including, for example: text, at least one image or a part thereof, at least one video or a part thereof, at least one sound or music or a part thereof. In some examples, data representing an image or a part thereof is, for example, representative of one or more display effects to be provided by at least one electrowetting element 702 of the electrowetting display device 701. The content data may include data representing a library of content, for example, a library of any of books, periodicals, newspapers, movies, videos, music, or podcasts, each of which may be represented by a collection of data which represents for example one book or one movie. Such a collection of data may include a mixture of content data of different types, for example, a movie may be represented by data including at least image data and sound data.

The above examples are to be understood as illustrative examples. Further examples are envisioned. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting element comprising:
a first fluid;

a second fluid immiscible with the first fluid; and
a support plate comprising:
   an electrode;
   a first layer comprising a migration pathway and a first surface in contact with at least one of the first fluid or the second fluid, the first surface comprising an opening from which the migration pathway extends into the first layer; and
   a substance disposed within at least a portion of the migration pathway in the first layer,
   the substance distinct from both the first fluid and the second fluid and configured to reduce migration of at least a component of the first fluid or a component of the second fluid through the migration pathway in the first layer.

2. The electrowetting element according to claim 1, wherein the migration pathway in the first layer comprises one of a pinhole, a pore, a space, an interstitial space, a recess, an aperture, a void, a channel, or a conduit.

3. The electrowetting element according to claim 1, wherein the substance comprises at least one of: a silicone oil; a straight chain perfluorinated alkane, a cyclic perfluorinated alkane, a branched perfluorinated alkane, a partly fluorinated alkane, a hydrofluorocarbon compound, a fluorinated compound, a perfluoroether, a perfluoropolyether, a perfluorinated amine, an at least partly fluorinated nonionic surfactant, a fluoroaliphatic polyoxyethylene, a straight chain alkane, a branched alkane, a monosubstituted alkane, a paraffin, a disubstituted alkane, or a trisubstituted alkane.

4. The electrowetting element according to claim 1, wherein the first layer comprises a wettable layer that is more wettable to the first fluid than to the second fluid with no voltage applied by the electrode.

5. The electrowetting element according to claim 1, wherein the first layer comprises a hydrophobic layer.

6. The electrowetting element according to claim 5, wherein the hydrophobic layer comprises at least one of: Teflon® AF1600, Teflon® AF2400, Hyflon® AD40, Hyflon® AD60, or Cytop®.

7. The electrowetting element according to claim 1, wherein the substance is immiscible with at least one of the first fluid or the second fluid.

8. A display device, comprising:
an electrowetting element comprising:
   a first fluid;
   a second fluid immiscible with the first fluid; and
   a support plate comprising:
      an electrode;
      a first layer comprising a migration pathway and a first surface in contact with at least one of the first fluid or the second fluid, the first surface comprising an opening from which the migration pathway extends into the first layer; and
      a substance disposed within at least a portion of the migration pathway in the first layer,
      the substance distinct from both the first fluid and the second fluid and configured to reduce migration of at least a component of the first fluid or a component of the second fluid through the migration pathway in the first layer;
at least one processor; and
at least one memory comprising computer program instructions, the at least one memory and the computer program instructions being configured to, with the at least one processor, control a configuration of the first fluid and the second fluid.

9. The display device according to claim 8, wherein the migration pathway in the first layer comprises one of a pinhole, a pore, a space, an interstitial space, a recess, an aperture, a void, a channel, or a conduit.

10. The display device according to claim 8, wherein the first layer comprises a wettable layer that is more wettable to the first fluid than to the second fluid when no voltage is applied by the electrode.

11. The display device according to claim 8, wherein the first layer comprises a hydrophobic layer.

12. The display device according to claim 8, wherein the substance comprises at least one of: a silicone oil; a straight chain perfluorinated alkane, a cyclic perfluorinated alkane, a branched perfluorinated alkane, a partly fluorinated alkane, a hydrofluorocarbon compound, a fluorinated compound, a perfluoroether, a perfluoropolyether, a perfluorinated amine, an at least partly fluorinated nonionic surfactant, a fluoroaliphatic polyoxyethylene, a straight chain alkane, a branched alkane, a monosubstituted alkane, a paraffin, a disubstituted alkane, or a trisubstituted alkane.

* * * * *